United States Patent
Sarrouh

[19]

[11] Patent Number: 5,772,885
[45] Date of Patent: Jun. 30, 1998

[54] SLUDGE REMOVAL SUCTION HEADER

[76] Inventor: Sami Sarrouh, 19323 Davinwood Dr., Cleveland, Ohio 44135

[21] Appl. No.: 832,606
[22] Filed: Mar. 31, 1997
[51] Int. Cl.$^6$ .................................................. B01D 21/04
[52] U.S. Cl. .......................... 210/523; 210/136; 210/525; 210/803
[58] Field of Search .................................. 15/415.1, 418, 15/420; 210/136, 236, 241, 523, 525, 528, 803

[56] References Cited

U.S. PATENT DOCUMENTS

| | | | |
|---|---|---|---|
| 3,669,271 | 6/1972 | McGivern | 210/128 |
| 3,847,802 | 11/1974 | Lemke | 210/527 |
| 4,181,614 | 1/1980 | Steenhorst | 210/221 |
| 4,401,576 | 8/1983 | Meurer | 210/525 |
| 4,857,185 | 8/1989 | Desjardins | 210/150 |
| 5,047,150 | 9/1991 | Mitchell | 210/525 |
| 5,078,869 | 1/1992 | DiGregorio et al. | 210/527 |
| 5,340,485 | 8/1994 | Bradley et al. | 210/767 |

*Primary Examiner*—Stanley S. Silverman
*Assistant Examiner*—Betsey J. Morrison
*Attorney, Agent, or Firm*—John D. Gugliotta

[57] ABSTRACT

A sludge removal suction header is provided having an obtuse angled header shape and a much larger header cross section width dimension than presently utilized in the existing art. A longer width to height above ground ratio is produced which invokes ground effects. Internal annular passages are provided for equalizing the pressure distribution inside the header, thereby improving flow distribution across all holes, and especially those holes at the end of the header which are furthest away from the vacuum/suction source. An optimized number and diameter size of suction holes is further provided, as well as flow splitters, located beneath the header. Also, an air removal system is provided and placed for allowing vacuum to be provided by a controlled volume suction system, such as by a positive displacement pump, and in a manner that the positive displacement pump is allowed to maintain its prime, and air infiltration caused by startups is automatically removed, thereby reducing flow resistance inside the piping and providing more suction capability to the header.

9 Claims, 8 Drawing Sheets

SLUDGE REMOVAL SUCTION HEADER

BACKGROUND OF THE INVENTION

1. Field of the Invention

The present invention relates generally to water/wastewater treatment sludge removal systems and, more particularly, to an improved suction header design and system for use with a water/wastewater treatment clarifier/thickener system.

2. Description of the Related Art

As is well-known in the art, municipal water/wastewater treatment facilities universally exist for the efficient and healthy distribution of potable water and disposal of industrial and municipal wastes. The impurity in any particular raw water or raw sewage stream regulates the amount of treatment required, and is usually measured either by the amount of suspended solids, or the biochemical oxygen demand. Present methods of water/sewage treatment are usually divided into primary, or physical treatment, secondary, or biochemical treatment, and tertiary treatment. Improvements in any stage of treatment can dramatically affect the overall treatment effectiveness. Primary treatments remove the "settleable" solids, with fine particles agglomerating to increase their size and permit settling. The coagulation of fine particles makes larger ones by flocculation, and these are then removed by sedimentation. The total process is a clarification or thickening operation, with the removed sediment often referred to as waste sludge. In its most basic form, a clarifier/thickener unit is used to decant liquid waste from any solid sludge, with constant improvements being made to increase the effectiveness of this operation.

Various water/wastewater treatment sludge removal systems are currently widely used with municipal water/wastewater treatment facilities.

Current and proposed clean water regulations requiring best available technology drives a trend for improvements in efficiency in an attempt to approach a zero waste emission, no matter at how incremental a pace.

Numerous examples at these incremental attempts have been made to improve the removal of sludge from a water/wastewater treatment clarifier/thickener. For instance, U.S. Pat. No. 5,340,485, issued in the name of Bradley et al., discloses an apparatus and method for clarifier sludge collection utilizing a central rotatable or stationery sludge collection box submerged in the clarifier tank and surrounding a vertical, central influent column or support shaft.

Further, in U.S. Pat. No. 4,181,614, issued in the name of Steenhorst, a sludge removal apparatus is disclosed including a sloping inverted channel positioned above a sparge pipe such that sludge lifted by gas from the sparge pipe rises up into the collector.

As a final example, in U.S. Pat. No. 3,669,271, issued in the name of McGivern, a siphon type sludge removal system for a sewage settling tank is disclosed.

Consequently, a need is continually felt for providing an apparatus and method which can increase the rate or efficiency of new or existing clarifiers used in municipal water/wastewater treatment sludge removal. One particular method of solids removal currently widely used involves the use of vacuumed sludge collectors. Such collectors generally comprise a suction header which is rotated, slid, or otherwise translated along the bottom of a clarifier unit for removing solids without decanting or dewatering. The core of the present invention involves various improvements in such a system.

SUMMARY OF THE INVENTION

It is therefore an object of the present invention to provide an improved sludge removal suction header for use with a municipal water/wastewater clarifier/settling basin system.

Briefly described according to the preferred embodiment of the present invention, a sludge removal suction header is provided having an obtuse angled header shape, and having a much larger header cross section dimension than presently utilized in the existing art. Internal annular passages equalize the pressure distribution inside the header, thereby improving flow distribution across all holes, and especially those holes at the end of the header which are furthest away from the vacuum source. An optimized number and diameter size of suction holes are also provided, which may vary according to the solids content, density and viscosity of sludge. Flow splitters are provided and located beneath the header, thereby reducing dead zones caused by translation of the header and formed between adjacent holes. This flow splitter channels the flow of sludge toward the header holes. Also included is an improved header/carriage/rail design which allows for one side of the header to rise a few inches above the floor, thereby aiding in passage of the header over uneven floors or other submerged obstacles. A heavy duty carriage allows for the application of greater translation forces, and is adaptable to tape or cable drives. High wear resistant rollers support and align the carriage and header assembly. Finally, an air removal system is provided for automatically removing most of the air introduced into the piping system every time the settling basin is drained or refilled.

It is a feature of the present invention to provide a sludge removal suction header having an improved vacuum system utilizing high vacuum positive displacement pumps. Other types of pumps may be used on small system. Such improvements, when utilized with an optimized number and diameter of holes in a suction header creates a high differential pressure across the header's holes, thereby aiding in the fluidizing and suction of high percentage solids sludge.

It is another feature of the present invention to provide a sludge removal suction header having a much larger header cross section width dimension than presently utilized in the existing art. Such a feature creates many advantages and benefits. By creating a large width-to-height-above-ground ratio, "ground effects" are created during translation of the header, thereby lowering the pressure under the header (near the holes) and further improving the suction of solids during header translation. Incidental benefits and advantages of utilizing a header with a much larger cross section dimension include easier installation in settling basins resulting from much higher installation heights. Such an installation also allows more sludge to pass under the header in each translation, thereby removing more sludge per pass. Designs in the present art require installation very close to the ground due to excessive cleaner water removal from above the header due to gravity.

Another feature of the present invention includes the use of an obtuse angled header shape, which results in a lower projected area while translating across sludge which minimizes resistance and turbulence. By minimizing turbulence, the sludge remains settled as the header passes over, thereby decreasing disturbance of the sludge bed before and after the suction header and minimizing interference with the suction's flow streamlines. Traditionally (older designs) the fluid flow streamlines from above the suction header are affected by gravity, and a boundary layer is formed which does not separate until it is very close to the suction holes.

A narrow "zone of influence" is thereby created. In the present invention the water coming from above being forced to separate from the header at the edges of the triangle. Thus, the fluid has to travel a longer distance before reaching the suction holes, hence enhancing the zone of influence. This mixing of fluid and sludge under the header fluidizes the sludge, and in combination with a low pressure zone at the suction hole, aids in urging the fluidized sludge into the holes.

Another advantage of such a header shape is its improved physical rigidity, especially in the direction of translation, thereby preventing bowing of the header as well as decreasing risk of damage when encountering large areas of thick sludge or other obstacles.

Yet another feature of the present invention includes internal annular passages for equalizing the pressure distribution inside the header, thereby improving flow distribution across all holes, and especially those holes at the end of the header which are furthest away from the vacuum source.

Yet another feature of the present invention includes an optimized number and diameter size of suction holes, which may vary according to the solids content, density and viscosity of sludge. Maximum pressure drop across each hole is then determined from data gathered from extensive testing.

Another feature of the present invention includes flow splitters, located beneath the header, for reducing dead zones caused by translation of the header and formed between adjacent holes. These flow splitters channel the flow of sludge toward the header holes.

Another feature of the present invention includes an improved header/carriage/rail design which allows for one side of the header to rise a few inches above the floor, thereby aiding in passage of the header over uneven floors or other submerged obstacles.

Yet another feature of the present invention includes a heavy duty carriage. The application of greater translation forces which may be necessary to plow through sludge beds can thereby be accomplished without damage to the header or carriage.

Further features of the present invention include a carriage design adaptable to tape or cable drives, and high wear resistant rollers supporting and aligning the carriage and header assembly. The first provides flexibility of design according to user's preference while allowing the traditionally problematic tape drives to function properly. The second creates less friction than skids, thereby requiring less pull force for normal header translation. Further, these rollers will not allow for derailment, tilt, or misalignment between the header and track.

Finally, an air removal system is provided which allows a higher vacuum to be provided by a controlled volume suction system, such as a positive displacement pump. A first advantage is a practical one: the positive displacement pump is allowed to maintain its prime, thereby negating the need to re-prime every time it is operated. Second, since air is continually introduced into the piping system every time the settling basin is drained or refilled, an air removal system automatically removes most of the air, thereby reducing flow resistance inside the piping and providing more suction capability to the header.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

DESCRIPTION OF THE PREFERRED EMBODIMENTS

Figure 1:
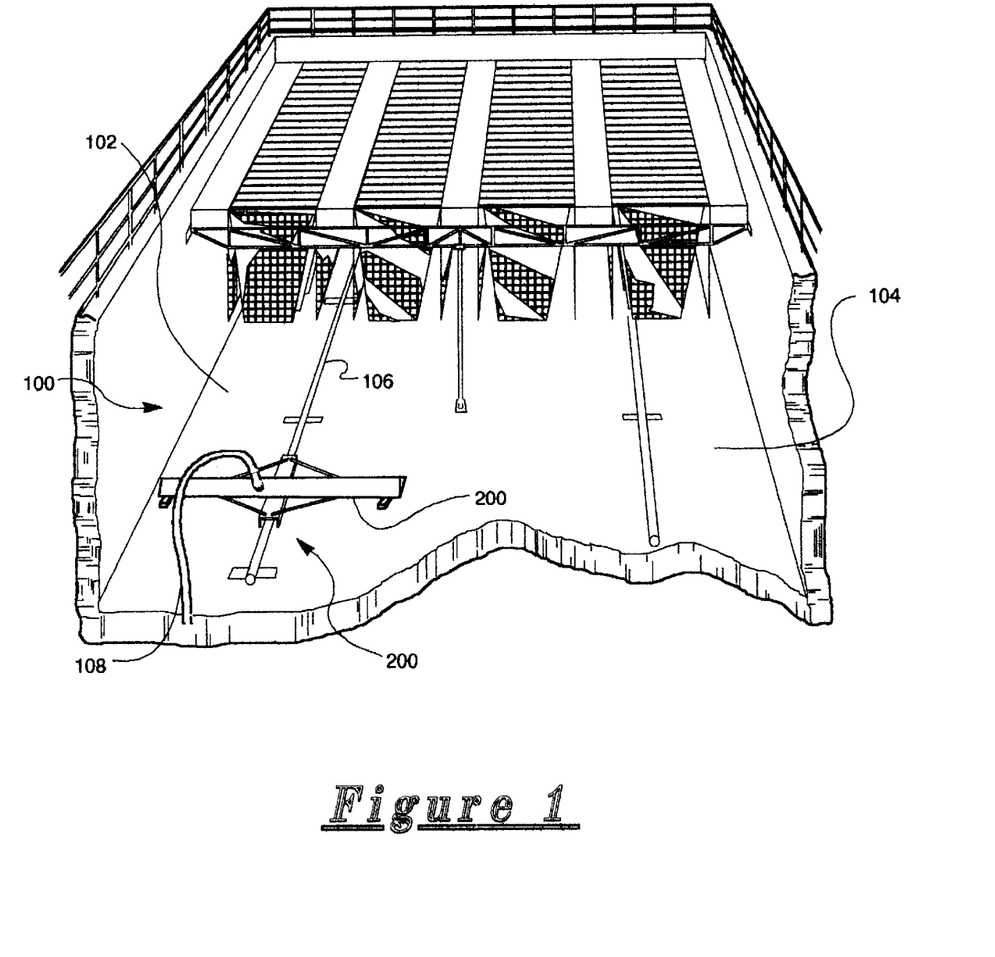
FIG. 1 is a partial perspective view of a sludge removal system as utilized with a typical waste treatment clarifier/thickener tank.

Referring now to FIG. 1, a sludge removal system is shown in use with a typical waste treatment clarifier/thickener tank utilizing the sludge removal system incorporating the improvements disclosed according to the present invention. A typical traveling sludge removal system 100 is shown within a sludge collection area 102 at the bottom of a clarifier tank (or thickener tank) 104. Typical installations form a sludge collection area 102 by gently sloping the bottom of the clarifier tank 104 towards the traveling sludge removal system 100. According to the preferred embodiment of the present invention, a vacuum sludge collector 200, shown in more detail in FIG. 2 below, supporting a header member 202 travels laterally across a guidance track 106. A vacuum conduit 108 maintains fluid communication between the internal volume of the header member 202 and a vacuum source (not shown), envisioned to be a positive displacement pump or other otherwise conventional vacuum source.

Figure 2:
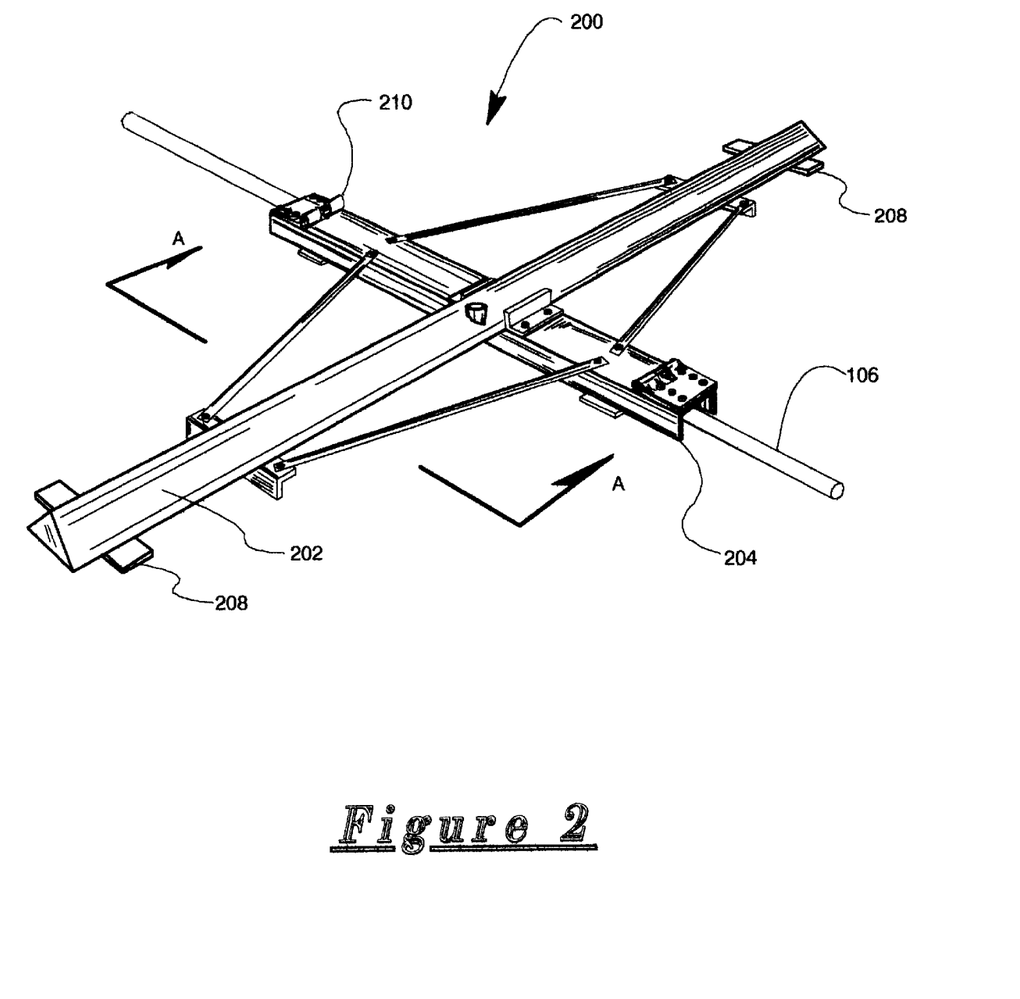
FIG. 2 is a perspective view of a sludge removal suction header according to the preferred embodiment of the present invention.
Figure 3:
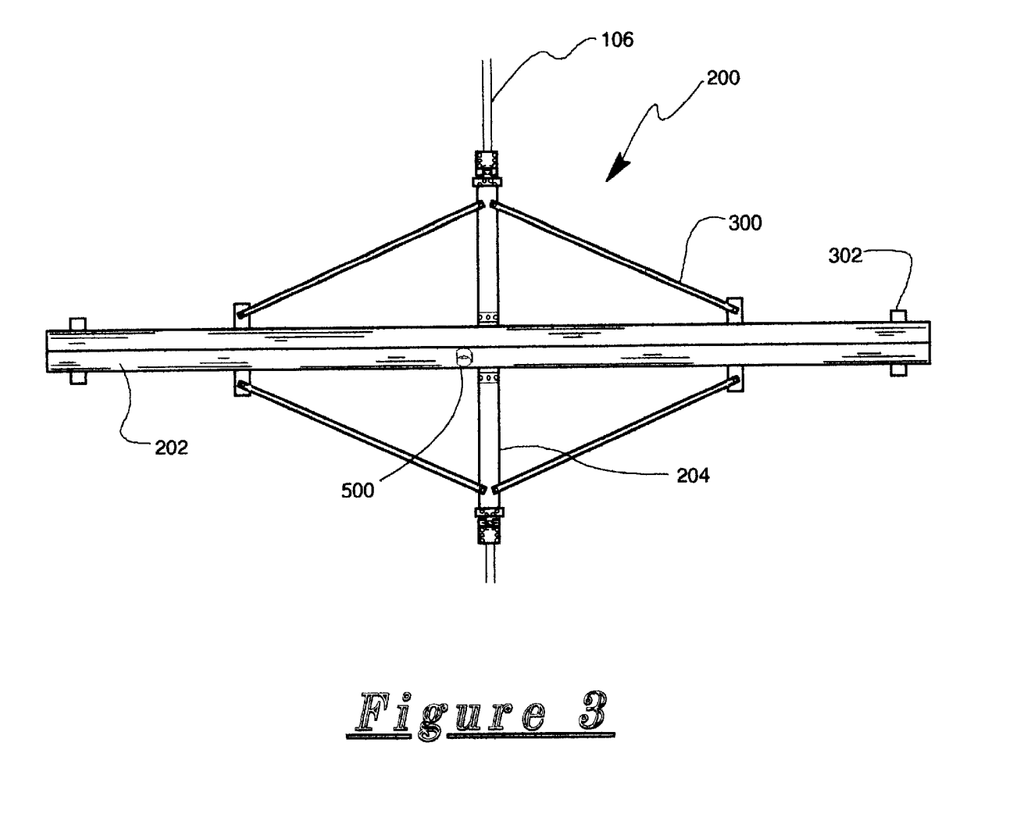
FIG. 3 is a top view thereof.

Referring to FIG. 2 and FIG. 3, the vacuum sludge collector 200 is depicted in greater detail and isolation from the remainder of the sludge removal system. The header member 202 is elongated and mounted transversely to, and in the preferred embodiment atop the track guide 204 in a transverse manner. Although this configuration is not unknown in the related art, the vacuum sludge collector 200 of the preferred embodiment displays and discloses a number of improvements unknown and unanticipated within the related art to allow for improved sludge removal, over and above that capacity capable with conventional systems. The main header member 202 is supported centrally by the track guide 204, as described above, and supported distally by travel support means 208 at each end. In its present commercial embodiment, each travel support means 208 is formed by a tabbed extension platform mounted on the lower surface of the header member 208 in order to support a wheeled castor guidance member. Although other configurations are envisioned, such a travel support means allows the vacuum sludge collector to drive laterally along the guidance track 106 and, when the header member 202 encounters obstructions or other impediments along the bottom of the sludge collection area 102, negotiate the obstruction by riding overtop or otherwise lifting one end of the header member 202 without misaligning the track guide 204 on the guidance track 106.

Further shown most clearly in FIG. 2 is the drive affixment means 210 attached to the track guide 204. It is envisioned that the present improvements can be utilized with either a tape drive mechanism or cable drive mechanism that are currently in wide use with other, presently available sludge removal systems. With such adaptability between drive systems, the present vacuum sludge collector 200 can be added to existing sludge removal systems to replace existing types of vacuum sludge collectors. In operation, the drive system, either tape drive or cable drive, is affixed to the track guide 204 at the drive affixment means 210 in order to translate the entire vacuum sludge collector 200 laterally across the bottom of the sludge collection area 102 along the guidance track 106.

FIG. 3 shows in greater detail the vacuum sludge collector 200 and the attachment of the header member 202 atop the track guide 204. During operational testing of the present invention, is has been discovered that the widest area of sludge removal coverage is accomplished via an elongated header member 202 affixed perpendicularly to the track guide 204. However, such an arrangement can generate increased stresses at the attachment point when the header member 202 encounters obstructions such as solid sludge impediments, irregular protrusions along the tank's lower surface, or the like. In order to provide the rigidity necessary for continuous, industrial use, a plurality of tension braces 300 have been included to provide additional structural integrity between the header member 202 and the track guide 204. In its preferred embodiment, four tension braces 300 have been included, each linearly elongated and affixed at one end to the header member 202 or an attachment tab 302 affixed to the header member, and the opposite end affixed to the track guide 204 at a point linearly separated from the header member's affixment point at the track guide 204. Such a configuration of tension braces 300, track guide 204, and header member 202 allows for an overall rigid carriage assembly for the vacuum sludge collector 200.

Figure 4:
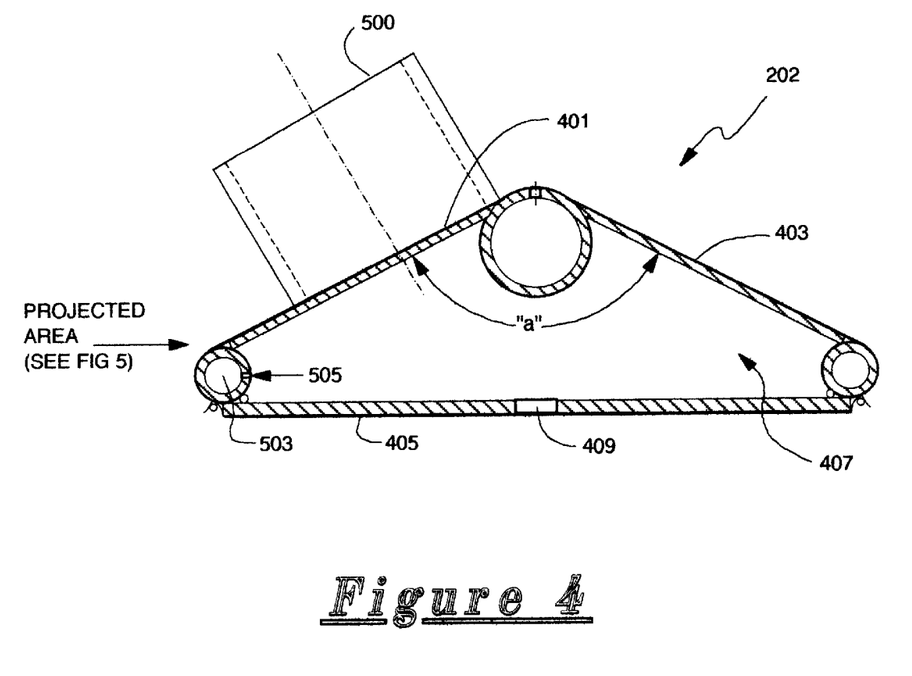
FIG. 4 is a cross sectional side view of the header member taken across line A—A in FIG. 2.

The detailed improvements for the suction collection header 202 is best shown in detail in FIG. 4. As opposed to conventional collection headers which are formed of cylindrical members, the preferred embodiment of the present suction collection header 202 is formed of a first upper header surface 401 attached to a second upper header surface 403 impinged together to form an obtuse angle "a" between the two header surfaces. A lower header surface 405 is attached at each side to one header surface to form an internal volume 407 having a triangular cross sectional area. This internal volume 407 functions as the main suction collection conduit. The lower header surface 405 forms a plurality of separated, linearly aligned main suction orifices 409. The first upper header surface 401 supports a main sludge header discharge port 500, which provide fluid communication from the sludge collection area 102, through the main suction orifice 409, into the internal volume 407, through the main sludge header discharge port 500, and into the vacuum conduit 108.

Figure 5:
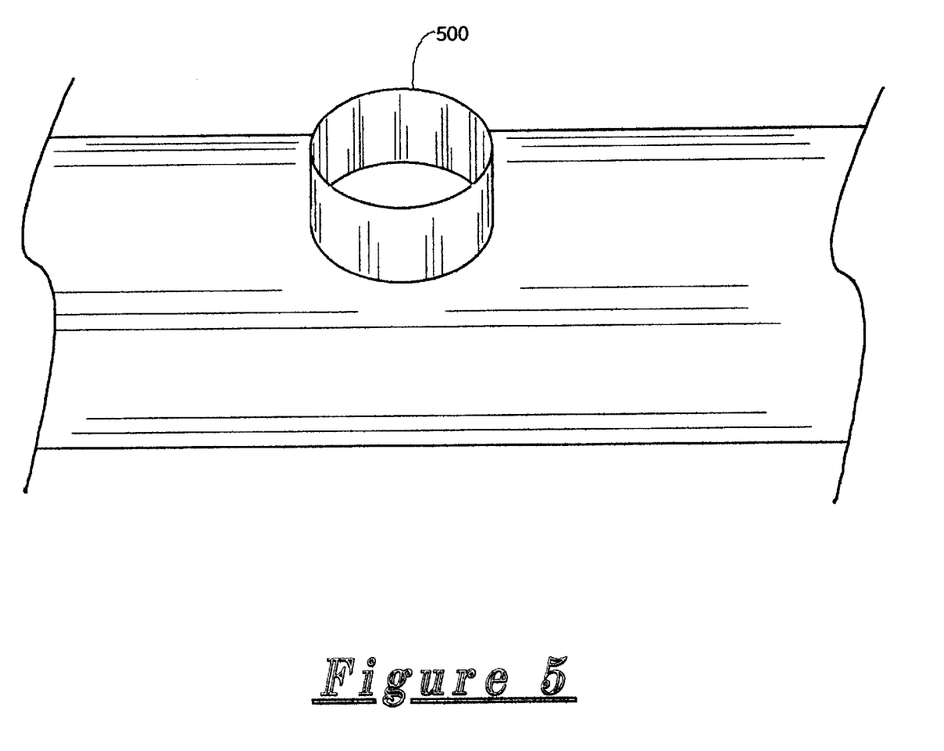
FIG. 5 is a detailed perspective view of the main suction orifice utilized with the present invention.

Advantages of such a triangular cross sectional area internal volume 407 are numerous. An obtuse angled header shape, which results in a lower projected area while translating across sludge which minimizes resistance and turbulence. This is not the case with rectangular cross sectional internal volumes. The projected area is better shown in FIG. 5. By minimizing turbulence, the sludge remains settled as the header passes over, thereby decreasing disturbance of the sludge bed before and after the suction header and minimizing interference with the suction's flow streamlines. Traditionally (older designs) the fluid flow streamlines from above the suction header are affected by gravity, and a boundary layer is formed which does not separate until it is very close to the suction holes. A narrow "zone of influence" is thereby created. In the present invention the water coming from above being forced to separate from the header at the edges of the triangle. Thus, the fluid has to travel a longer distance before reaching the suction holes, hence enhancing the zone of influence. This mixing of fluid and sludge under the header fluidizes the sludge, and in combination with a low pressure zone at the suction hole, aids in urging the fluidized sludge into the holes.

Another advantage of such a header shape is its improved physical rigidity, especially in the direction of translation, thereby preventing bowing of the header as well as decreasing risk of damage when encountering large areas of thick sludge or other obstacles. Such is the case with cylindrical header shapes; however, circular cross sectional area internal volumes provide for the minimum suction collection flow.

The present disclosure accomplishes benefits of various existing designs in a synergistic manner, providing an optimization that is unknown and otherwise unpredicted by the related art.

Further improvements shown in FIG. 4 include the addition of at least one internal annular passage 503 having a plurality of linearly aligned air flow distribution orifices 505 which function as a vacuum distribution header within the sludge collection header. As is currently shown, an internal annular passage 503 is shown at each intersection between header surfaces. Such internal annular passages 503 equalize the pressure distribution inside the header, thereby improving flow distribution across all holes, and especially those holes at the end of the header which are furthest away from the vacuum source. Additional benefits arise should localized blockages occur within the internal volume 407. In such a case, vacuum is distributed around the blockage, thereby minimizing the impact of such a blockage. An optimized number and diameter size of suction holes are also provided, which may vary according to the solids content, density and viscosity of sludge.

Figure 6:
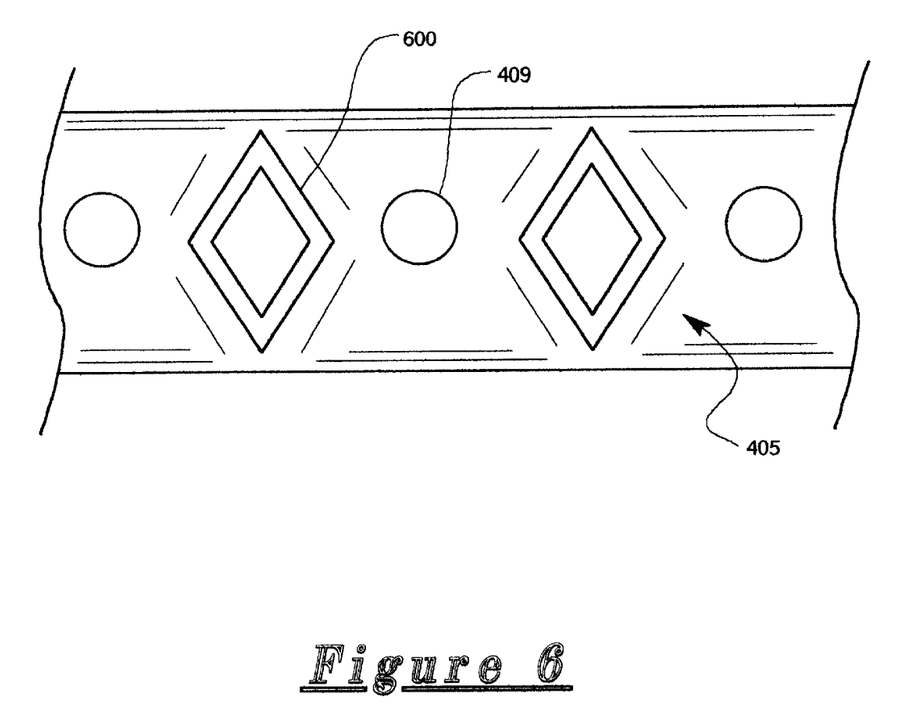
FIG. 6 is a detailed bottom plan view of a partial section of the header member shown in FIG. 4.

As shown in FIG. 6, flow splitters 600 are also envisioned as being provided and located on and protruding slightly from the lower header surface 405, thereby reducing dead zones as shown caused by translation of the header and formed between adjacent holes. These flow splitters 600 channel the flow of sludge toward the main suction orifices 409.

Figure 7:
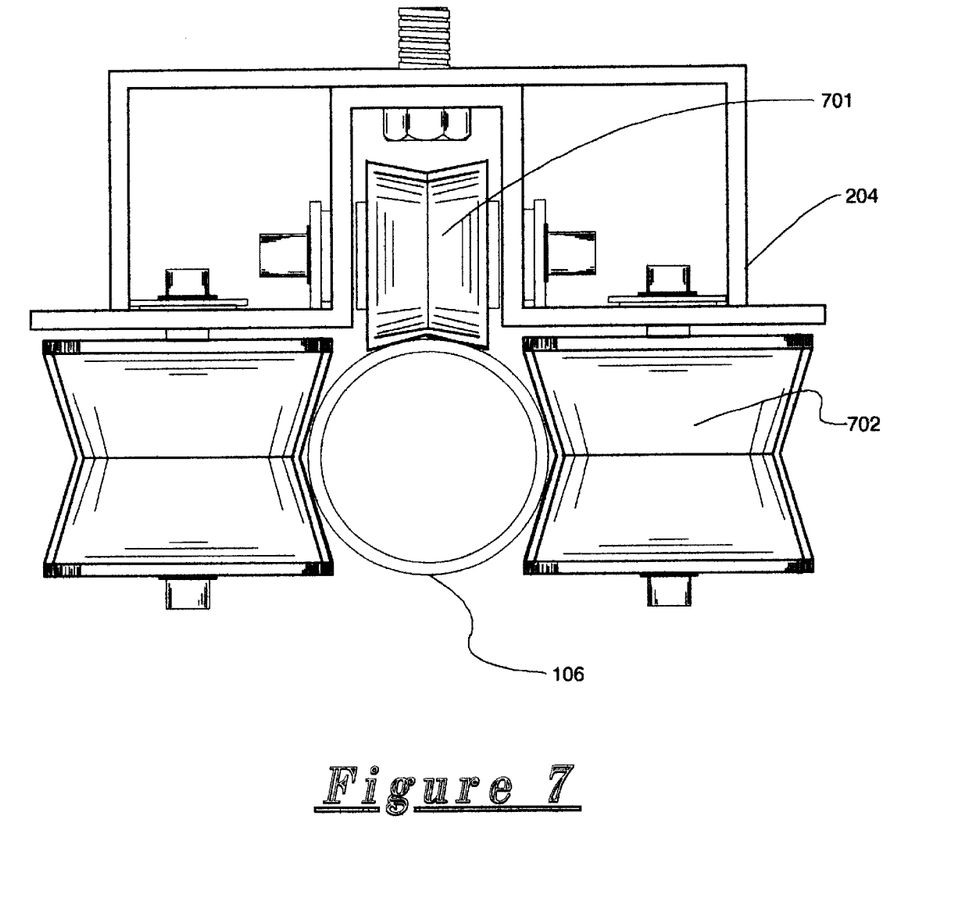
FIG. 7 is an end elevational view of a header track guide system for use with the preferred embodiment of the present invention.

In FIG. 7 a more detailed view of the improvements in the header carriage assembly are shown. The track guide 204 supports both a support roller 701, for rolling in a supportive fashion atop the guidance track 106, and a pair of opposed guidance rollers 702 straddling each side of the guidance track 106. Such configuration of rollers allows for one side of the header to rise a few inches above the floor, thereby aiding in passage of the header over uneven floors or other submerged obstacles. Further, the application of greater translation forces which may be necessary to plow through sludge beds can thereby be accomplished without damage to the header or carriage. Further, these rollers will not allow for derailment, tilt, or misalignment between the header and track.

Figure 8:
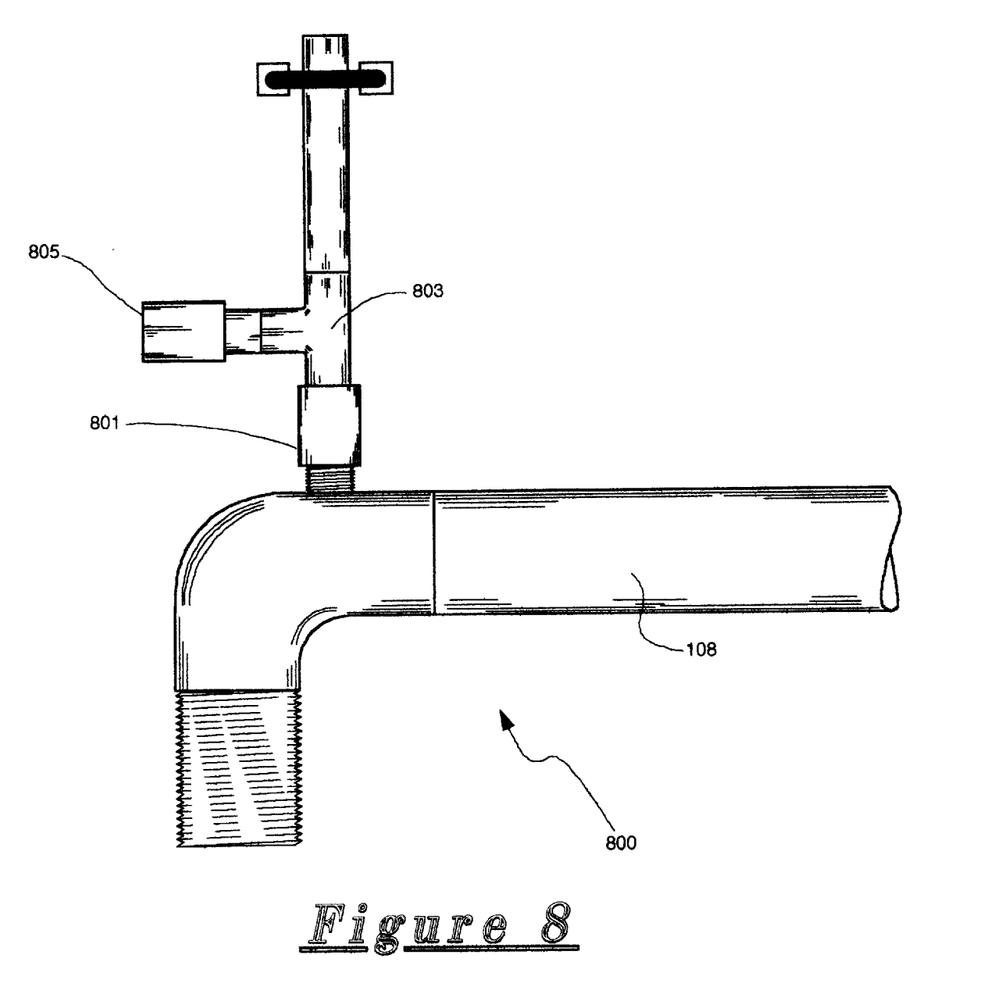
FIG. 8 is a side view of an air removal system for use with the preferred embodiment of the present invention.

Finally, in FIG. 8 an air removal system 800 is provided which allows a higher vacuum to be provided by a controlled volume suction system, such as a positive displacement pump. A first ball check valve 801 is in communication with the vacuum conduit 108. A conventional tee 803 is then affixed to the discharge of the first ball check valve 801, and a second check valve 805 affixed to one discharge of the tee 803. A first advantage of this air removal system is a practical one: the positive displacement pump is allowed to maintain its prime, thereby negating the need to re-prime every time it is operated. Second, since air is continually introduced into the piping system every time the settling basin is drained or refilled, an air removal system automatically removes most of the air, thereby reducing flow resistance inside the piping and providing more suction capability to the header.

The foregoing description is included to illustrate the operation of the preferred embodiment and is not meant to limit the scope of the invention. The scope of the invention is to be limited only by the following claims.

What is claimed is:

1. A sludge removal suction header system for use with a water/wastewater treatment sludge removal system, said sludge removal suction header system comprising:

an obtuse angled shaped header, said header having an outer wall and forming a large cross section width dimension;

internal annular passages for equalizing the pressure distribution inside said header, a plurality of suction orifices penetrating said outer wall;

flow splitters located on and protruding slightly from a lower surface of said header; and an air removal system for exhausting air from said header.

2. The sludge removal suction header system as described in claim 1, wherein said water/wastewater treatment removal system utilizes vacuum provided by a positive displacement pump; and wherein said air removal system is located in a manner such that said positive displacement pump is allowed to maintain its prime, and air infiltration is automatically removed, thereby reducing flow resistance inside the piping and providing more suction capability to the header.

3. A sludge removal suction header system for use with a water/wastewater treatment sludge clarifying/settling basin system, said sludge removal suction header system comprising:

an obtuse angled shaped header, said header having an outer wall and forming a large cross section dimension;

an internal annular passages for equalizing the pressure distribution inside said header;

a plurality of suction holes penetrating said outer wall and allowing said internal annular passages to communicate with the exterior of said header; and a flow splitter, said flow splitter located on and protruding slightly from a lower surface of said header, for channeling the flow of sludge toward said suction holes.

4. The sludge removal suction header system for use with a water/wastewater treatment sludge clarifying/settling basin system as described in claim 3, further comprising:

a heavy duty carriage adaptable to tape or cable drives.

5. The sludge removal suction header system for use with a water/wastewater treatment sludge clarifying/settling system as described in claim 3, further comprising:

wear resistant roller support for supporting and aligning a carriage to said header assembly.

6. The sludge removal suction header system as described in claim 3, wherein said water/wastewater treatment clarifier system utilizes vacuum provided by a positive displacement pump; and wherein said air removal system is located in a manner such that said positive displacement pump is allowed to maintain its prime, and air infiltration is automatically removed, thereby reducing flow resistance inside the piping and providing more suction capability to the header.

7. A sludge removal suction header system for use with a water/wastewater treatment sludge removal system, said sludge removal suction header system comprising:

an elongated suction collection header, said collection header formed of a first upper header surface attached to a second upper header surface and impinged together to form an obtuse angle between the two header surfaces; and a lower header surface is attached at each side to one header surface to form an internal volume having a triangular cross sectional area;

a plurality of separated, linearly aligned main suction orifices formed with said lower header surface;

flow splitters located on and protruding slightly from said lower header surface; and internal annular passages within said suction collection header for equalizing the pressure distribution inside said header.

8. The sludge removal suction header system as described in claim 7, further comprising:

an air removal system for exhausting air from said header.

9. The sludge removal suction header system as described in claim 8, wherein said air removal system comprises:

a first ball check valve having an intake port in fluid communication with said collection header and a discharge port;

a conventional tee affixed to said discharge of the first ball check valve; and a second check valve affixed to one discharge of said tee.

* * * * *